United States Patent [19]

Liu et al.

[11] Patent Number: 4,877,834

[45] Date of Patent: Oct. 31, 1989

[54] LUBRICATING OIL CONTAINING A MANNICH BASE

[75] Inventors: Christopher S. Liu, Poughkeepsie; Donald J. Clarke, Cold Spring; Larry D. Grina, Wappingers Falls, all of N.Y.

[73] Assignee: Texaco Inc., White Plains, N.Y.

[21] Appl. No.: 190,860

[22] Filed: May 6, 1988

Related U.S. Application Data

[62] Division of Ser. No. 36,950, Apr. 10, 1987, Pat. No. 4,780,230.

[51] Int. Cl.$^4$ .............................................. C08L 51/00
[52] U.S. Cl. ................................. 525/66; 252/51.5 R; 524/504; 525/502
[58] Field of Search ................................. 525/66, 502; 252/51.5 R

[56] References Cited

U.S. PATENT DOCUMENTS 4,668,412  5/1987  Hart et al. ...................... 252/51.5 A Primary Examiner—Theodore E. Pertilla
Attorney, Agent, or Firm—Robert A. Kulason; James J. O'Loughlin; Carl G. Seutter

[57] ABSTRACT

A lubricating oil contains a carbon-carbon backbone polymer containing residual unsaturation and bearing graft moieties derived from graft monomers containing ethylenic unsaturation and an epoxide moiety, and bonded to at least one of said graft moieties through an opened epoxide moiety, a Mannich base, prepared by reaction of an amine, an aldehyde, and a hindered phenol containing an active hydrogen atom.

25 Claims, No Drawings

LUBRICATING OIL CONTAINING A MANNICH BASE

This is a division, of application Ser. No. 036,950, filed Apr. 10, 1987 now U.S. Pat. No. 4,780,230 issued Oct. 23, 1988.

FIELD OF THE INVENTION

This invention relates to a lubricating oil containing a Mannich base. More particularly, it relates to a lubricating oil containing a Mannich condensate prepared from a hindered phenol containing an active hydrogen atom.

RELATED APPLICATION

A related patent application is Ser. No. 749,336, filed 27 June 1985 (now U.S. Pat. No. 4,668,412) for Lubricating Oil Containing Dispersant VII and Pour Depressant of Texaco Inc. as assignee of William P. Hart and Christopher S. Liu.

BACKGROUND OF THE INVENTION

As is well known to those skilled in the art, many compositions have been tested as additives for lubricating oils. Various compounds have been synthesized to serve as building blocks for the preparation of these additives which are intended to improve properties including viscosity, viscosity index, pour point, dispersancy, etc. of lubricating oils or fuels.

It is an object of this invention to provide a novel lubricating oil containing a Mannich base. Other objects will be apparent to those skilled in the art.

STATEMENT OF THE INVENTION

In accordance with certain of its aspects, this invention is directed to a method which comprises adding to a reaction mixture (i) a polymer, having a carbon-carbon backbone and containing residual unsaturation, derived from a monomer containing an ethylenically-unsaturated double bond, and (ii) a graft monomer containing ethylenic unsaturation and an epoxide moiety;

maintaining said reaction mixture at graft polymerization conditions thereby forming graft polymer containing moieties derived from said graft monomer; and recovering said graft polymer containing moieties derived from said graft monomer.

DESCRIPTION OF THE INVENTION

The Mannich Base

The Mannich bases which may be used in accordance with the process of this invention may be prepared by reacting (i) a primary or secondary amine, (ii) an aldehyde, and (iii) a hindered phenol containing an active hydrogen atom. As illustrative of prior art, note the procedure set forth at page 317 of volume 81 (1974) of Chemical Abstracts—Abstract 3881W. This is an abstract of an article by Zagidullin—Inst. Khim., Ufa, USSR *Kim Vysokomol Soedin Neftekhim* 1973, 44–45. According to this procedure, there may be reacted phthaloyl imide, paraformaldehyde, and 2,6-di-t-butyl phenol.

The amine which may be employed to prepare the Mannich base compositions may be a monoamine or a polyamine. When the amine is a monoamine, it may be a primary or secondary amine characterized by the formula $R_yNH_{3-y}$ wherein y is 1 or 2.

In the above compound, R may be a hydrocarbon selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, sec-buty, amyl, octyl, decyl, octadecyl, etc. When R is aralkyl, it may typically be benzyl, beta-phenylethyl, etc. When R is cycloalkyl, it may typically be cyclohexyl, cycloheptyl, substituted R groups may include 3-ethoxypropyl, 2-ethoxyethyl, carboethoxymethyl, 4-methyl cyclohexyl, p-methoxyphenyl, p-methoxybenzyl, 3-methoxy-5-methylphenyl, etc. The preferred R groups may be lower alkyl, i.e. $C_1$–$C_{10}$ alkyl, groups including eg methyl, ethyl, n-propyl, i-propyl, butyls, amyls, hexyls, octyls, decyls, etc. R may preferably be n-propyl.

Typical monoamines which may be employed include:

TABLE

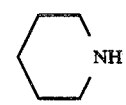

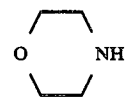

One preferred class of amines is that designated by the formula $CH_3(CH_2)_nNH_2$ wherein n is equal to or greater than 1.

The Mannich bases prepared from the monoamine may be found to possess antioxidant activity; however, when it is desired to attain the highest antioxidancy and dispersancy, it is preferred to utilize polyamines, which may be coupled to a polymer.

The preferred polyamine compositions which may be employed to prepare the Mannich base may include primary or secondary polyamines. The polyamines may typically be characterized by the formula

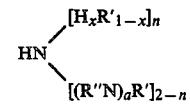

In this formula, a may be a number 1–20, preferably 1–10, say 5; x is 0 or 1; and n may be 0 or 1.

In the above compound, R' may be hydrogen or a hydrocarbon group selected from the group consisting of alkyl, aralkyl, cycloalkyl, aryl, and alkaryl, including such radicals when inertly substituted. When R' is alkyl, it may typically be methyl, ethyl, n-propyl, iso-propyl, n-butyl, i-butyl, sec-butyl, amyl, octyl, decyl, octadecyl, etc. When R' is a aralkyl, it may typically be benzyl, beta-phenylethyl, etc. When R' is cycloalkyl, it may typically be cyclohexyl, cycloheptyl, cycloctyl, 2-methylcycloheptyl, 3-butylcyclohexyl, 3-methylcyclohexyl, etc. When R' is aryl, it may typically be phenyl, napthyl, etc. When R' is alkaryl, it may typically be tolyl, xylyl, etc. R' may be inertly substituted i.e. it may bear a non-reactive substituent such as alkyl, aryl, cycloalkyl, ether, etc. Typically inertly substituted R' groups may include 2-ethoxyethyl, carboethoxymethyl, 4-methyl cyclohexyl, etc. The preferred R' groups may be hydrogen or lower alkyl, i.e. $C_1-C_{10}$ alkyl, groups including eg methyl, ethyl, n-propyl, i-propyl, butyls, amyls, hexyls, octyls, decyls, etc. R' may preferably be hydrogen.

R'' may be a hydrocarbon selected from the same group as R' subject to the proviso that R'' is divalent and contains one less hydrogen atom. R'' may be alkylene, alkarylene, aralkylene, cycloalkylene, or arylene. In an alternative embodiment, R'' may together with the nitrogen atoms, form a cycloaliphatic or an aromatic ring typified by piperazine which is included within the general formula.

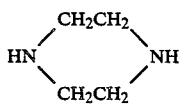

Typical polyamines which may be employed may include the following:

TABLE
propylenediamine
diethlenetriamine
di-isopropylenetriamine
triethylenetetramine
tetraethylenepentamine
pentaethylenehexamine
piperazine
N—aminomethyl piperazine
N—(beta-aminoethyl) piperazine
N—hydroxyethylpiperazine In one embodiment, R' may be hydrogen and R'' —$CH_2CH_2$—. It is preferred however that the amine be a piperazine, preferably, N-(beta-aminoethyl) piperazine.

The charge aldehyde which may be employed may include those preferably characterized by the formula $R^5CHO$.

In the above compound $R^5$ may be hydrogen or a hydrocarbon group selected from the group consisting of alkyl, aralkyl, cycloalkyl, aryl, or alkaryl, including such radicals when inertly substituted. When $R^5$ is alkyl, it may typically be methyl, ethyl, n-propyl, iso-propyl, n-butyl, i-butyl, sec-butyl, amyl, octyl, decyl, octadecyl, etc. When $R^5$ is aralkyl, it may typically be benzyl, beta-phenylethyl, etc. When $R^5$ is cycloalkyl, it may typically be cyclohexyl, cycloheptyl, cyclooctyl, 2-methylcycloheptyl, 3-butylcyclohexyl, 3-methylcyclohexyl, etc. When $R^5$ is aryl, it may typically be phenyl, naphthyl, etc. When $R^5$ is alkaryl, it may typically be tolyl, xylyl, etc. $R^5$ may be inertly substituted i.e. it may bear a non-reactive substituent such as alkyl, aryl, cycloalkyl, ether, etc. Typically inertly substituted $R^5$ groups may include 2-ethoxyethyl, carboethoxymethyl, 4-methyl cyclohexyl, etc. The preferred $R^5$ groups may be lower alkyl, i.e. $C_1-C_{10}$ alkyl, groups including eg methyl, ethyl, n-propyl, i-propyl, butyls, amyls, hexyls, octyls, decyls, etc. $R^5$ may preferably be hydrogen.

Typical aldehydes which may be employed may include the following:

TABLE
formaldehyde
ethanal
propanal
butanal etc,

The preferred aldehyde may be formaldehyde employed as its polymer—paraformaldehyde.

The charge hindered phenols may be characterized by the formula $HR^6OH$. It is a feature of these phenols that they contain an active hydrogen which will be the site for reaction and that they contain hindering or blocking groups (at least one and typically two) in positions adjacent to the —OH group. At least one position which may be meta-, but which is preferably ortho- or para- to the phenol hydroxy group, must be occupied by an active hydrogen as this is the point of reaction with the aldehyde group.

$R^6$ may be an arylene hydrocarbon group bearing hindering substituents at the 2-position and more preferably at the 2- and 6-positions. Typical hindering groups include bulky group typified by t-butyl or t-amyl. Presence of such groups contributes anti-oxidant ability to the resultant product. Typical hindered phenols groups may include bulky group typified by t-butyl or t-amyl. Presence of such groups contributes anti-oxidant ability to the resultant product. Typical hindered phenols may include:

TABLE
2,6-di-t-butyl phenol
2,6-di-t-amylphenol

The preferred phenol may be 2,6-di-t-butyl phenol.

A typical hindered phenol may be

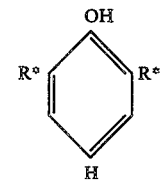

wherein R* is a hydrocarbon group bonded to the ring through a carbon atom which is bonded only to other carbon atoms.

Reaction to form the phenol-amine-aldehyde Mannich condensate may be effected by adding 0.1–1.3 moles, say 0.2–1.5 moles of aldehyde and 0.1–1.3 moles, say 1 mole of phenol and 0.1–1.3 moles of amine. In one preferred embodiment, one mole of formaldehyde (as paraformaldehyde) may react with one mole of 2,6-di-t-butyl phenol and 1 mole of N-aminoethylpiperazine.

Reaction is preferably effected by adding the reactants (preferably the aldehyde is added last) to a reaction operation under a blanket of inert gas, typically nitrogen. The reaction mixture is maintained at 80° C.–160° C., say about 100° C. for 1–5 hours, say 2 hours.

Typically reaction may be as follows:

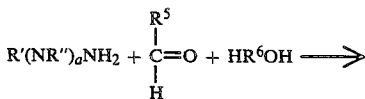

-continued

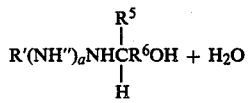

In a specific embodiment, the reaction may be as follows:

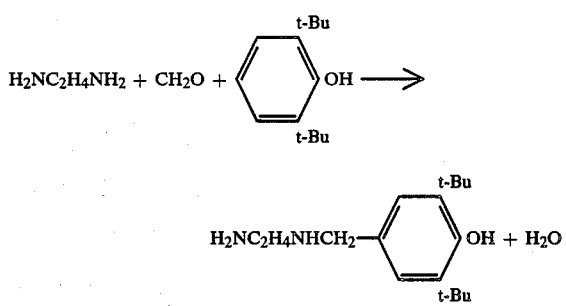

Illustrative phenol-amine-aldehyde Mannich base condensates which may be so formed include the following:

TABLE

A. 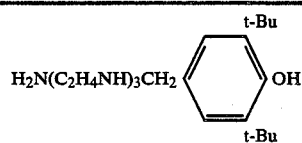

B. 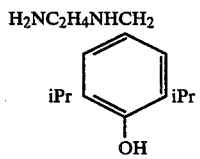

C. 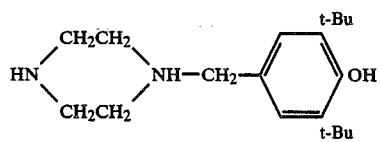

D. 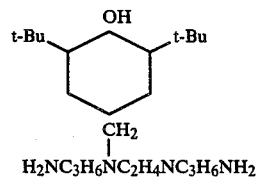

E. 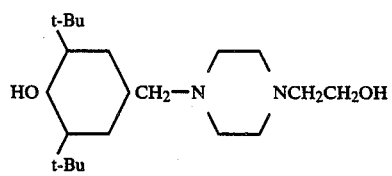

The Mannich base so prepared may be utilized in the form of a concentrate in inert diluent-solvent which is preferably a lubricating oil which is compatible with the medium e.g. lubricating oil in which the Mannich base is to serve as antioxidant. Typically the concentrate may contain 0.05–2 w%, preferably 0.1–1 w%, say 0.5 w% of Mannich base in diluent-solvent.

THE GRAFT POLYMER

The Polymer

In practice of this invention according to certain of its aspects, a first reactant may be grafted onto a polymer.

The polymer, onto which the first reactant may be grafted, may include an oil-soluble, substantially linear, carbon-cabon backbone polymer. Typical carbon-carbon backbone polymers prepared from monomers bearing an ethylenically unsaturated polymerizable double bond which may be employed include homopolymers or copolymers prepared from monomer

and/or

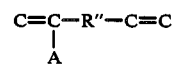

wherein A may be: hydrogen; hydrocarbon such as alkyl, aryl, etc.; acetate or less preferred acyloxy (typified by —COOR); halide; etc. R" may be divalent hydrocarbon typified by alkylene, alkarylene, aralkylene, cycloalkylene, arylene, etc.

Illustrative of such monomers may be acrylates; methacrylates; vinyl halides (such as vinyl chloride); styrene; olefins such as propylene, butylene, etc.; vinyl acetate; dienes such as butadiene, isoprene, hexadiene, ethylidene norbornene, etc. Homopolymers of olefins, (such as polypropylene, polybutylene, etc.), dienes, (such as hydrogenated polyisoprene), or copolymers of ethylene with e.g. butylene and higher olefins, styrene with isoprene and/or butadiene may be employed. The preferred carbon-carbon backbone polymers include those selected from the group consisting of ethylene-propylene copolymers (EPM or EPR) and ethylene-propylene-diene terpolymers (EPDM or EPT).

When the polymer is an ethylene-propylene copolymer (EPM, also called EPR polymers), it may be formed by copolymerization of ethylene and propylene under known conditions preferably Ziegler-Natta reaction conditions. The preferred EPM copolymers contain units derived from ethylene in amount of 40–70 mole %, preferably 50–60 mole %, say 55 mole %, the remainder being derived from propylene.

The molecular weight $\overline{M}_n$ of the EPM copolymers which may be employed may be 10,000–1,000,000, preferably 20,000–200,000, say 140,000. The molecular weight distribution may be characterized by a polydispersity index $\overline{M}_w/\overline{M}_n$ of less than about 15, preferably 1.2–10, say 1.6.

Illustrative EPM copolymers which may be employed in practice of the process of this invention may be those set forth in the following table, the first listed being preferred:

A. The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a $\overline{M}_w/\overline{M}_n$ of 1.6.

B. The Epcar 505 brand of EPM marketed by B. F. Goodrich Co., containing 50 mole % of units derived from ethylene and 50 mole % units derived from propylene and having a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5.

When the polymer is a terpolymer of ethylene-propylene-diene (EPT or EPDM), it may be formed by copolymerization of ethylene, propylene and diene monomer. The diene monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40-70 mole %, preferably 50-65 mole %, say 60 mole % and units derived from the propylene in amount of 20-60 mole %, preferably 30-50 mole %, say 38 mole % and units derived from diene monomer in amount of 0.5-15 mole %, preferably 1-10 mole %, say 2 mole %. The molecular weight $\overline{M}_n$ of the terpolymers may typically be 10,000-1,000,000, preferably 20,000-200,000, say 120,000. Molecular weight distribution of the useful polymers is preferably narrow viz a $\overline{M}_w/\overline{M}_n$ of typically less than 15, preferably 1.5-10, say 2.2.

Illustrative EPT terpolymers which may be employed in practice of the process of this invention may be those set forth in the following table, the first listed being preferred.

TABLE

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a polydispersity index of 2.2.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity index of 2.

D. The Royalene brand of EPT marketed by Uniroyal containing 60 mole % of units derived from ethylene, 37 mole % of units derived from propylene, and 3 mole % of units derived from dicyclopentadiene; and having a $\overline{M}_n$ of 100,000 and a polydispersity index of 2.5.

E. The Epsyn 40A brand of EPT marketed by Copolymer Rubber and Chemical Corp., containing 60 mole % of units derived from ethylene, 37 mole % of units derived from propylene, and 3 mole % of units derived from ethylidene norbornene and having a $\overline{M}_n$ of 140,000 and a polydispersity index of 2.

The EPM and EPT polymers may contain minor portions (typically less than about 30%) of other units derived from other copolymerizable monomers.

THE GRAFT POLYMER

The Graft Monomer

The graft monomer which may be employed in practice of the process of this invention contains ethylenic unsaturation and an epoxide moiety.

Preferably the graft monomer may be characterized by the formula:

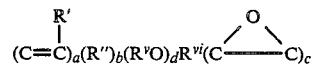

wherein $C=C$ is an ethylenically unsaturated double bond;

R' is hydrogen or alkyl, alkaryl, aralkyl, cycloalkyl, or aryl;

R'' is divalent moiety selected from the group consisting of —COO— and —R$^v$—; and a is an integer greater than 0;

b is an integer 0–1 c is an integer 1–3; and d is an integer 0–1.

In the above formula, R' may be hydrogen or a hydrocarbon selected from the group consisting of alkyl, aralkyl, cycloalkyl, aryl, and alkaryl, including such radicals when inertly substituted. When R' is alkyl, it may typically be methyl, ethyl, n-propyl, iso-propyl, n-butyl, i-butyl, sec-butyl, amyl, octyl, decyl, octadecyl, etc. When R' is aralkyl, it may typically be benzyl, beta-phenylethyl, etc. When R' is cycloalkyl, it may typically be cyclohexyl, cycloheptyl, cyclooctyl, 2-methylcycloheptyl, 3-butylcyclohexyl, 3-methylcyclohexyl, etc. When R' is aryl, it may typically be phenyl, naphthyl, etc. When R' is alkaryl, it may typically be tolyl, xylyl, etc. R' may be inertly substituted i.e. it may bear non-reactive substituent such as alkyl, aryl, cycloalkyl, etc. Typically inertly substituent R' groups may include 4-methyl cyclohexyl, etc. The preferred R' groups may be lower alkyl, i.e. it may bear non-reactive substituent such as alkyl, aryl, cycloalkyl, etc. Typically inertly substituted R' groups may include 4-methyl cyclohexyl, etc. The preferred R' groups may be lower alkyl, i.e. $C_1$–$C_{10}$ alkyl, groups including e.g. methyl, ethyl, n-propyl, i-propyl, butyls, amyls, hexyls, octyls, decyls, etc.

In the above formula, R$^v$ or R$^{vi}$ may be divalent hydrocarbon radical selected from the group consisting of alkylene, aralkylene, cycloalkylene, arylene, and alkarylene including such radicals when inertly substituted. When R$^v$ or R$^{vi}$ is alkylene, it may typically be methylene, ethylene, n-propylene, iso-propylene, n-butylene, i-butylene, sec-butylene, amylene, octylene, decylene, octadecylene, etc. When R$^v$ or R$^{vi}$ is aralkylene, it may typically be benzylene, beta-phenylethylene, etc. When R$^v$ or R$^{vi}$ is alkarylene, it may typically be tolylene, xylylene, etc. R$^{vi}$ may be inertly substituted i.e. it may bear a non-reactive substituent such as alkyl, aryl, cycloalkyl, ether, etc. Typically inertly substituted R$^v$ or R$^{vi}$ groups may be lower alkyl, i.e. $C_1$–$C_{10}$ alkylene, groups including e.g. methylene, ethylene, n-propylene, i-propylene, butylene, amylene, hexylene, octylene, decylene, etc. R$^v$ and R$^{vi}$ may typically be methylene —$CH_2$—.

In the above formula, R'' is a divalent moiety selected from the group consisting of —COO— and —R$^v$—. Preferably R'' is —COO—.

a is an integer, greater than 0; and preferably a is 1. It is preferred that the double bond be not on the carbon atom which forms the epoxy ring. Preferably there is only one ethylenic double bond in the molecule; and when there are more, it is preferred that they be separated i.e. not adjacent or conjugated.

b is an integer 0–1. When b is 0 and d is 1, it will be apparent that the composition includes an ether moiety. When b is 1 and d is 0, the composition includes an ester moiety if R" is —COO—.

c is an integer 1–3. Preferably c is 1.

d is an integer 0–1. When b and d are both zero, the composition includes a hydrocarbon moiety.

In its preferred aspects, the graft monomer may be characterized by the formula

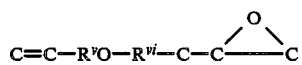

Illustrative graft monomers may include:

TABLE allyl glycidyl ether
2-methallyl glycidyl ether
glycidyl methacrylate
p-glycidyl styrene
styrene-p-glycidyl ether
3,4-epoxy-1-pentene
3,4-epoxy-1-butene The preferred graft monomer is allyl glycidyl ether.

The grafting reaction may be carried out by adding the polymer to diluent-solvent in a reaction vessel and heating at 80° C.–160° C. to form a homogenous solution. The graft monomer and free radical initiator (in a molar ratio of monomer to initiator of 1–8:1, preferably 1.5–5:1) are added. The temperature is maintained above the decomposition temperature of the initiator for 0.25–5 hours, preferably 0.4–2 hours, under an inert atmosphere to form the desired product.

Typical free radical initiators may include dicumyl peroxide, dibenzoyl peroxide, di-t-butyl peroxide, azobisisobutyronitrile, diacetyl peroxide, t-buty-peracetate, diisopropyl peroxydicarbonate, etc.

In a typical grafting reaction, a solution containing 25 parts of ethylene-propylene copolymer and 75 parts of solvent such as hexane or mineral oil is prepared. Then 2.5 parts of a monomer and 1 part of dicumyl peroxide are added and maintained in the presence of nitrogen at temperature of 155±5° C. and atmospheric pressure of 200 psig (when hexane is solvent) for 1 hour. Enough mineral oil is then added to obtain a fluid concentrate at room temperature. When the grafting is carried out in hexane, a stripping step is included.

The product grafted polymer may contain 0.3–20 mole %, preferably 0.5–10 mole %, say 2 mole % derived from the monomer.

The product formed by the graft polymerization reaction may be

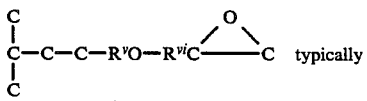 typically

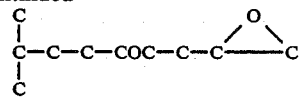

THE COUPLING REACTION

In accordance with certain of its aspects, this invention is directed to a method which comprises forming a reaction mixture containing (i) a graft polymer, having a carbon-carbon backbone polymer containing residual unsaturation, bearing graft moieties derived from a graft monomer containing ethylenic unsaturation and an epoxide moiety, and as a coupling composition at least one of (ii) a Mannich base formed by reacting an aldehyde, a primary or secondary amine, and a hindered phenol containing an active hydrogen atom, and (iii) a primary or secondary coupling amine;

maintaining said reaction mixture at coupling reaction conditions thereby effecting coupling of said coupling composition through a nitrogen atom to the opened epoxide moieties derived from said graft monomer on said carbon-carbon backbone polymer; and recovering said product polymer wherein said coupling composition joined through a nitrogen atom to the opened epoxide moieties derived from said graft monomer on said carbon-carbon backbone polymer.

Although it may be possible to attain useful products when the graft polymer is coupled only to the Mannich base or only to the coupling amine, it is preferred that the graft polymer be coupled to both.

The coupling reaction may be carried out by adding to a reaction mixture (i) 20–30 parts, preferably 22–28 parts say 26 parts of graft polymer in solution in 70–80 parts, preferably 72–78 parts, say 74 parts, of diluent-solvent; (ii) 0.8–3.9 parts, preferably 1–2 parts, say 1.3 parts of Mannich base formed by the reaction of an aldehyde, a primary or secondary amine, and a hindered phenol containing an active hydrogen atom, preferably in 4–19.5 parts, more preferably 5–10 parts, say 7.8 parts of diluent-solvent, and (iii) 0.2–1.5 parts, preferably 0.4–1 parts, say 0.5 parts of coupling amine typically in 1–10 parts, preferably 2–5 parts, say 2.5 parts of diluent-solvent. Preferably the graft polymer is added first and then the Mannich base and then the coupling amine.

Coupling is carried out in liquid phase at 145° C.–165° C., preferably 150° C.–160° C., say 155° C. and 0–250 psig, preferably 0–220 psig, say atmospheric pressure over 2–0.3 hours, preferably 0.5–1.5 hours, say 1 hour.

When the diluent-solvent is a low boiling liquid as is the case with hexane, it is preferred to exchange it with a heavier oil such as SNO-100 oil. This may be effected by adding the heavy oil while distilling off the lower boiling diluent-solvent. When the diluent-solvent is a heavier oil, the product may be diluted with additional diluent solvent to form a concentrate containing 8–9.5 weight percent, preferably 8.5–9 weight percent, say 9 weight percent active component in the oil.

LUBRICATING OIL COMPOSITIONS

It is a feature of this invention that the various compositions prepared in accordance with the practice of this invention may be used in lubricating oils to impart improved properties.

Typical lubricating oils to which the additives of this invention may be added include summer or winter automotive, aviation, railway, diesel, etc. lubricating oils whether hydrocarbon or synthetic (e.g. ester) oils.

According to one of its aspects, this invention is directed to a lubricating oil composition comprising a major portion of a lubricating oil and a minor effective portion of a polymer bearing a Mannich base formed by reacting an aldehyde, a primary or secondary amine, and a hindered phenol containing an active hydrogen atom.

It is found that oils so prepared, containing as little as 0.02 w%, but preferably 0.5–2.5 weight percent, preferably 1–2 weight percent, say 1.5 weight percent of Mannich base—containing polymer, may be characterized by improved anti-oxidancy as measured by the Bench Oxidation Test.

In this test a 1.5 w% of polymer in SNO-130 oil is blown with air while heated and stirred. Samples are withdrawn periodically for analysis by Differential Infrared Absorption (DIR) to observe changes in the carbonyl vibration band at 1710/cm. Higher carbonyl vibrational band intensity indicates a lower thermal-oxidative stability of the sample.

A typical oil so prepared may be a fully formulated automotive lubricating composition comprising 9 parts of VI improver coupled with Mannich base prepared by reacting (i) formaldehyde, (ii) 2,6-di-t-butyl phenol, and (iii) N-(beta-amino ethyl) piperazine.

In comparative tests, The Edwin Cooper AN-701 brand of 2,6-di-t-butyl phenol (a prior art anti-oxidant), is tested against the product of this invention formed from the Epsyn brand of EPM rubber containing 0.013 moles of Mannich base per mole of EPM. The product of this invention is found to be more stable than that containing an equimolar quantity of the 2,6-di-t-butyl phenol as measured by the Bench Oxidation Test.

The compositions so prepared may also be found to be characterized by high dispersancy when the concentration of additive is 12 w%–20 w%, preferably 14 w%–18 w%, say 15 w%.

Dispersancy is measured by the Bench VC Test (BVCT). In this test, dispersancy relative to three references is tested. The reference blends are known to possess an excellent dispersancy, a good dispersancy, and a poor dispersancy. Better dispersants are characterized by lower ratings; and a rating at around the good standard is indicative of a promising candidate.

According to another of its aspects, this invention is directed to a lubricating oil composition comprising a major portion of a lubricating oil and a minor effective portion of a polymer, having a carbon-carbon backbone and containing residual unsaturation, derived from a monomer containing an ethylenically unsaturated double bond, bearing graft moieties derived from a graft monomer containing a ethylenic unsaturation and an epoxide moiety.

It is found that oils so prepared, containing 4–15%, preferably 8–15 w%, more preferably 9–12 w%, say 9 w% of graft polymer may be characterized by ability to yield lubricating oil compositions of improved dispersancy index as measured by the BVCT.

A typical oil so prepared may be a fully formulated automotive lubricating composition containing 91 parts of lubricating oil and 9 parts of graft polymer prepared by grafting alkyl glycidyl ether onto an ethylene-propylene copolymer of $\overline{M}_n$ of 100,000 and $\overline{M}_w/\overline{M}_n$ of 2.

According to another of its aspects, this invention is directed to a lubricating oil composition comprising a major portion of a lubricating oil and a minor effective portion of a composition comprising a carbon-carbon backbone polymer containing residual unsaturation bearing graft moieties derived from a graft monomer containing ethylenic unsaturation and an epoxide moiety, and bonded to at least one of said graft moieties through an opened epoxide moiety, a primary or secondary coupling amine and bonded to at least one of said graft moieties through an opened epoxide moiety a Mannich base formed by the reaction of an aldehyde, a primary or secondary amine, and a hindered phenol.

It is found that oils so prepared containing 8 w%–15 w%, preferably 9 w%–12 w%, say 9 w% of graft polymer coupled with Mannich base and with amine may be characterized by ability to yield lubricating oil compositions of improved properties including dispersancy, viscosity index, and antioxidancy.

It is a particular feature of the products of this invention that when used in lubricating oil systems in diesel engines, they permit attainment of superior antioxidancy, viscosity index and dispersancy and also overall diesel performance as measured by the MWM-B test and the Cat I-H2 test.

DESCRIPTION OF SPECIFIC EMBODIMENT

Practice of the process of this invention will be apparent to those skilled in the art from the following wherein, as elsewhere in this application, all parts are parts by weight. Control examples are designated by an asterisk. Unfilled valence bonds may be filled with hydrogen atoms or inert substituents (i.e. which do not interfere with the designated reaction).

EXAMPLE I

In this example which illustrates the best mode presently known of carrying out the process of this invention, a Mannich base and a coupling amine are coupled to an EPM polymer bearing graft moieties derived from allyl glycidyl ether.

Preparation of Mannich Base

There is added to a reaction mixture, under nitrogen, 206 parts (one mole) of Ethyl AN-701 brand of 2,6-di-t-butylphenol and 205 parts (1.6 moles) of N-beta-aminoethyl) piperazine. As the mixture is agitated at 20° C., there is slowly added over 30 minutes 45 parts (1.5) moles of paraformaldehyde.

The reaction mixture is heated to 110° C. and refluxed at that temperature for two hours and then cooled to ambient temperature of 25° C. After filtration to remove excess unreacted paraformaldehyde, the reaction mixture is heated to 160° C. at 3 mmHg pressure (to distill off the unreacted phenol and piperazine). The product Mannich base is identified by Gas Chromotography-Mass Spectroscopy (GC-MS) and Nuclear Magnetic Resonance (NMR).

Preparation of Graft Polymer

There is added to a reaction mixture, 26 parts of the Epsyn brand of ethylene-propylene copolymer containing 60 mole percent of units derived from ethylene and 40 mole percent of units derived from propylyene—$\overline{M}_n$ of 140,000 and $\overline{M}_w/\overline{M}_n$ of 1.6, in solution in 74 parts of commercial hexane. The reaction mixture is heated to 155° C. and 2000 psig and there is added 5.3 parts of allyl glycidyl ether dissolved in 10 parts of commercial hexane followed by 2.7 parts of dicumyl peroxide in 10 parts of commercial hexane. The mixture is maintained at 155° C. for one (1) hour with agitation.

The Coupling Reaction

There is added to the above reaction mixture, 2.7 parts of morpholine as coupling amine and 5 parts of Mannich base.

The reaction mixture is maintained at 155° C. for one hour. The solvent hexane is then exchanged with 276 parts of SNO-100 oil. The final mixture contains 8.6 parts of active ingredient in 100 parts of oil.

EXAMPLE II*

In this control Example, the procedure of Example I is generally followed except that the Mannich base was not present and the quantities of ingredients are as set forth in the following table.

EXAMPLE III*

In this control Example, the preceding Example I is generally followed, except that the Mannich base is simply mixed with (and not coupled to) the EPM graft polymer which had been functionalized with the coupling amine and the quantities of ingredients are as set forth in the following table.

EXAMPLE IV

In this Example, the procedure of Example I is generally followed except that no coupling amine (morpholine) is present and the quantities of ingredients are as set forth in the following table.

Each of these four products is tested for dispersancy in the BVCT. The following Table lists the specific amounts of the various components (based upon 100 parts of ethylene-propylene copolymers) and the BVCT results:

TABLE

| Component | I | II* | III* | IV |
|---|---|---|---|---|
| EPM | 100 | 100 | 100 | 100 |
| Dicumyl Peroxide | 2.7 | 2 | 1.7 | 2 |
| Allyl Glycidyl Ether | 5.3 | 2 | 3.5 | 4 |
| Glycidyl Methacrylate | — | 2 | — | — |
| Morpholine | 2.7 | 2.7 | 2.7 | — |
| Mannich Base | 5 | — | 5 | 12 |
| TEST RESULTS | | | | |
| BVCT | 47.2 | 94.5 | 92.5 | 36.0 |
| Reference | 17.2/47.7/65.0 | 15.8/42.8/60.3 | 21.6/45/66 | 14.6/34/2/40/6 |

From the above Table, the following conclusions may be drawn:

(i) Experimental Example I (wherein both amine and Mannich base are present) is characterized by a desirable dispersancy rating as measured by the BVCT.

(ii) Control Example II* (which has no Mannich base) is characterized by undesirable dispersancy. Thus it is clear that the Mannich base contributes to desired dispersancy.

(iii) Control Example III* (wherein the Mannich base is merely mixed with the polymer), is characterized by undesirable dispersancy. Thus it is clear that immobilization of the Mannich base is essential in order to obtain desired dispersancy from the Mannich base.

(iv) Control Example IV shows that, if the Mannich base is present in sufficient amount, the product is characterized by desirable dispersancy even though no coupling amine (morpholine) is present. Example IV* indicates that although good dispersancy may be achieved without amine, it requires a substantial quantity of Mannich base and is thus undesirably more expensive. Immobilization of Mannich base does not lessen its ability to provide dispersancy.

It is noted that the products of Examples I, III, and IV showed satisfactory antioxidant ability as shown by the following Table which records data resulting from the Bench Oxidation Test.

EXAMPLES V*-VI*-VII

In this series of runs, the antioxidant properties of various compositions were measured by subjecting the compositions to oxidation conditions and measuring the degree of oxidation.

Results are measured by the increase in the C=O absorption at 1710/cm.

In control Example V*, the sample tested is the Epsyn brand rubber.

In control Example VI, the sample tested is the same polymer which has been mixed with 4.5 weight percent of the Mannich base of Example I.

In experimental Example VII, the sample tested is the same polymer which has been functionalized with the Mannich base of Example I (no coupling amine is present).

In control Example VIII*, the sample tested is the same polymer which has been mixed with 5.3 w% of 2,6-di-t-butyl phenol.

The results are as follows:

TABLE

| | DIR - ABSORBANCE/CM | | | |
|---|---|---|---|---|
| | EXAMPLE | | | |
| Hours | V | VI* | VII | VIII* |
| 0 | 0 | 0 | 0 | 0 |
| 24 | 7.5 | 2.0 | 0.25 | 1.0 |
| 96 | 12 | 2.75 | 0.75 | 15.75 |
| 120 | 14 | 3.25 | 1.0 | 18.75 |
| 144 | 15 | 3.75 | 1.25 | 20.25 |

From the above Table, it is apparent that the polymer possesses alone (Example V) poor resistance to oxidation, that the mixture of polymer and Mannich base (Example VI*) possesses improved resistance to oxidation (e.g. by a factor of 4 after 144 hours) and that the polymer bearing coupled Mannich base (Example VII) possesses even better resistance to oxidation (e.g. by a factor of 12 after 144 hours). It is apparent from control Example VIII* that a mixture of polymer and 2,6-di-t-butyl phenol is unsatisfactory. Immobilization yields a dispersancy not attained by mere mixing (qv USP No. 4,324,717 showing simple mixing). Antioxidancy is provided not by the hindered phenol but by the reaction product of the phenol and the Mannich base.

Results comparable to those attained by Example I may be attained if the Mannich base is made from the following hindered phenol:

TABLE

| Example | Hindered Phenol |
|---------|-----------------|
| IX | 2,6-di-t-amyl phenol |

Results comparable to those of Example I may be attained if the Mannich base is made from the following aldehydes:

TABLE

| Example | Aldehyde |
|---------|----------|
| X | Ethanal |
| XI | Propanal |
| XII | Butanal |

Results comparable to those of Example I may be attained if the Mannich base is made from the following amines:

TABLE

| Example | Amine |
|---------|-------|
| XIII | Propylene Diamine |
| XIV | Tetraethylene Pentamine |
| XV | Pentaethylene Hexamine |
| XVI | Piperazine |
| XVII | Ethylene Diamine |

Results comparable to those of Example I may be attained if the polymer is as follows:

TABLE

| Example | POLYMER |
|---------|---------|
| XVIII | The Ortholeum 5655 brand of EPT marketed by DuPont containing 62 mole percent of units derived from ethylene, 36 mole percent of units derived from propylene, and 2 mole percent of units derived from 1,4-hexadiene and having a $\overline{M}_n$ of 75,000 and a polydispersity index $\overline{M}_w/\overline{M}_n$ of 2. |
| XIX | The Ortholeum 2052 brand of EPT marketed by DuPont containing 62 mole percent of units derived from ethylene, 36 mole percent of units derived from propylene, and 2 mole percent of units derived from 1,4-hexadiene and having a $\overline{M}_n$ of 35,000 and polydispersity index $\overline{M}_w/\overline{M}_n$ of 2. |

Results comparable to those of Example I may be attained if the graft monomer is as follows:

TABLE

| Example | Graft Monomer |
|---------|---------------|
| XX | 2-methallyl glycidyl ether |
| XXI | glycidyl methacrylate |
| XXII | p-glycidyl styrene |
| XXIII | styrene-p-glycidyl ether |

Results comparable to those of Example I may be attained if the coupling amine is as follows:

TABLE

| Example | Coupling Amine |
|---------|----------------|
| XXIV | N—hydroxyethyl piperazine |
| XXV | N—methyl morpholine |
| XXVI | piperazine |
| XXVII | N—aminoethyl piperazine |
| XXVIII | N—methyl piperazine |
| XXIX | dimethylaminopropyl amine |
| XXX | pyrrolidine |
| XXXI | tetraethylene pentamine |
| XXXII | pentaethylene hexamine |

EXAMPLE XXXIII–XXXIV*

In this series of comparative examples, a first experimental sample (Example XXXIII) is made up as in Example I but using 2.5 w% (based on rubber) of N-methyl piperazine (in place of morpholine).

A control sample (Example XXXIV*) is made up by using a commercial prior art dispersant viscosity index improver (which does not contain an antioxidant) in place of the experimental additive.

In Examples XXXIII–XXXIV*, the base oil is a 5W-30 Havoline type motor oil containing 9 w% of control or experimental additive.

The Experimental and Control formulations are tested in the Standard Sequence III D Test which uses a 1977, 350 CID (5.7 liter) Oldsmobile V-8 engine at high speed (3000 rpm) and high oil temperature 300° F. (149° C.) for 64 hours with oil additions permitted. The test is run with leaded gasoline. Lubricating oil characteristics which may be measured include (i) high temperature oil oxidation (as measured by percent increase in viscosity), (ii) piston deposits (as measured by visual merit rating), (iii) oil consumption, (iv) piston ring wear, (v) viscosity, etc.

In the case of viscosity, the increase in viscosity of the oil may be measured. When testing additives to a standard 5W-30 Havoline type oil, the limit on the % viscosity increase for satisfactory performance is 375; and the lower the better. Satisfactory systems may be formed to have % viscosity increase of ca 150–250.

The Experimental and Control formulations are found to have the following ratings:

|  | Ex XXXIV* | Ex XXXIII |
|---|---|---|
|  | Rating | |
| VI Improver | Commercial | Experimental |
| % Viscosity Increase | 1014 | 194 |

From the above table, it is apparent that, at comparable concentrations, the Commercial product shows an undesirable viscosity increase of 1014% while the Experimental product desirably shows only a 194% increase. (The limit for satisfactory performance is 375%—with higher ratings being undesirable).

EXAMPLE XXXV*

In this series of Examples, the products of Examples XXXIII and XXXIV* are further tested against Control Example XXXV* in which the lubricating oil contains the same amount of additive as in Examples XXXIII and XXXIV*. The additive includes the commercial additive of Example XXXIV* plus 5 w% of the Mannich base prepared according to Example I (the reaction product of 2,6-di-t-butyl phenol and N-(beta-aminoethyl) piperazine and paraformaldehyde). The Mannich base in this Control Example XXXV* is merely mixed and not coupled to the polymer which is present.

In this series of tests, the base oil (in which the products of Examples XXXIII, XXXIV* and XXXV* are tested) is a 15W-40 Ursa Super Plus type oil—in which the additive is present in amount of 8 w%.

The samples of Examples XXXIII-XXXIV* and XXXV* are tested in the MWM-B (CEC L-12-A-76) Test to determine piston cleanliness. In this test, the additive is added to a standard lubricating oil (a 15W-40 Ursa Super Plus type oil). The lubricating oil is tested in a standard single cylinder (850 cc) naturally aspirated diesel engine operating at 2200 rpm for 50 hours with a pump temperature of 110° C. (230° F.). After a run, the engine is disassembled and piston cleanliness is evaluated by MWM-B test. A higher merit rating is an indication of a promising candidate.

The results are as follows:

TABLE

|  | Ex XXXIII | Ex XXXIV* | Ex XXXV* |
|---|---|---|---|
| VI Improver | Experimental | Commercial | Mixture |
| Merit Rating | 58,60 | 53 | 53 |

From the above table, it is apparent that Experimental Example XXXIII received a desirably higher merit rating than did either of control examples XXXIV* or XXXV*.

The product of this invention in Example XXXIII is particularly characterized by better performance in European diesel engines than the commercial product.

In a further series of tests, the formulations of Examples XXXIII and XXXIV* are tested in the Caterpilar—1H2 Test which utilizes a 133.5 CID supercharged diesel engine operating at 1800 rpm. Fuel is a diesel oil containing 0.4 w% sulfur yielding 4950 BTU/minute. Oil temperature is maintained at 180° F. (82° C.) over the 480 hour test. The following characteristics of the lubricating system may be determined: (i) ring sticking, (ii) ring and cylinder wear, and (iii) accumulation of piston deposits. In this instance the Waste Total Demerits (WTD), at 120 hours, are determined by visual merit rating. A rating which is below that of the control is indicative of a promising candidate. There is also determined the % Top Growth Field (% TGF) which is an indication of performance of the additive package. A rating which is below that of the control is indicative of a promising candidate. The oil in which the additive system is tested is a 10W-30 Ursa Super Plus type oil in which the additive is present in amount of 4.75 w%.

The results are as follows:

TABLE

|  | Ex XXXIII | EX XXXIV* |
|---|---|---|
| VI Improver | Experimental | Commercial |
| WTD rating 120 hours | 88.5 | 119 |
| % TGF | 44 | 45 |

From the above table it is apparent that Experimental Example XXXIII received desirably lower ratings than did Control Example XXXIV*.

In a further series of tests, the formulations of Examples XXXIII and XXXIV* are tested in the Sequence V-D Test which utilizes a 2.3 liter Ford OHC four-cylinder engine at low to mid-range speeds and oil temperatures. This method simulates stop and go urban and moderate freeway driving. Test duration is 192 hours—run on unleaded gasoline with exhaust gas recirculationg (EGR). Oil characteristics which may be evaluated include (i) sludge deposits, (ii) varnish deposits, (iii) oil ring clogging, (iv) oil screen plugging, and (v) cam wear.

In this test, in which the additives are present in 11.4 w% concentration in a 10W-40 Low P HS type oil, the following are measured: (i) piston skirt varnish (PSV), as measured by visual merit rating, (ii) average varnish (AV), as measured by visual merit rating, and, (iii) average sludge (AS), as measured by visual merit rating. The ratings are aas follows:

TABLE

|  | Limit | Ex XXXIII | EX XXXIV* |
|---|---|---|---|
| VI Improver |  | Experimental | Commercial |
| PSV | 6.7 mm | 6.8 | 6.5 |
| AV | 6.6 mm | 6.2 | 6.5 |
| AS | 9.4 mm | 9.7 | 9.7 |

From the above table, it is apparent that the formulation of this invention compares favorably with the control commercial formulation.

Although this invention has been illustrated by reference to specific embodiments, it will be apparent to those skilled in the art that various changes and modifications may be made which clearly fall within the scope of this invention.

We claim:

1. The method which comprises forming a reaction mixture containing (i) a graft polymer, having a carbon-carbon backbone polymer containing residual unsaturation bearing graft moieties derived from a graft monomer containing ethylenic unsaturation and an epoxide moiety, and (ii) a Mannich base formed by the reaction of an aldehyde, a primary or secondary amine, and a hindered phenol;

maintaining said reaction mixture at coupling reaction conditions thereby effecting coupling of said Mannich base through a nitrogen atom to an opened epoxide moiety of said graft monomer on said carbon-carbon backbone polymer; and recovering said product polymer wherein said Mannich base is joined through a nitrogen atom to an opened epoxide moiety of said graft monomer on said carbon-carbon backbone polymer.

2. A composition comprising a carbon-carbon backbone polymer containing residual unsaturation bearing graft moieties derived from a graft monomer containing ethylenic unsaturation and an epoxide moiety, and bonded to at least one of said graft moieties through an opened epoxide moiety, a Mannich base formed by the reaction of an aldehyde, a primary or secondary amine, and a hindered phenol.

3. The method which comprises forming a reaction mixture containing (i) a Mannich base formed by reacting an aldehyde, a primary or secondary amine, and a hindered phenol containing an active hydrogen atom, and (ii) a graft polymer, having a carbon-carbon backbone polymer containing residual unsaturation, bearing graft moieties derived from a graft monomer containing ethylenic unsaturation and an epoxide moiety, and (iii) a primary or secondary coupling amine;

maintaining said reaction mixture at coupling reaction conditions thereby effecting coupling of said Mannich base and said coupling amine with said graft polymer and forming product polymer wherein said coupling amine and said Mannich base are each joined through a nitrogen atom to opened epoxide moieties of said graft monomer on said carbon-carbon backbone polymer; and recovering said product polymer wherein said coupling amine and said Mannich base are joined through a nitrogen atom to the opened epoxide moieties of said graft monomer on said carbon-carbon backbone polymer.

4. The method claimed in claim 3 wherein said polymer is a copolymer of ethylene-propylene or a terpolymer of ethylene-propylene-diene monomer.

5. The method claimed in claim 3 wherein said phenol is characterized by the formula:

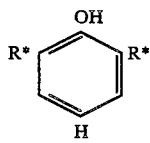

wherein R* is a hydrocarbon group bonded to the ring through a carbon atom which is bonded only to other carbon atoms.

6. The method claimed in claim 3 wherein said amine is N-(beta-aminoethyl) piperazine.

7. The method claimed in claim 3 wherein said coupling amine is morpholine.

8. The method claimed in claim 3 wherein said graft monomer is characterized by the formula

wherein

C=C is an ethylenically unsaturated double bond;

$R^v$ or $R^{vi}$ is a divalent hydrocarbon moiety selected from the group consisting of alkylene, alkarylene, aralkylene, cycloalkylene, and arylene;

R' is hydrogen or alkyl, alkaryl, aralkyl, or cycloalkyl,

R" is a divalent moiety selected from the group consisting of —COO— and —$R^v$—; and a is an integer greater than 0;

b is an integer 0–1;

c is an integer 1–3; and d is an integer 0–1.

9. The method claimed in claim 3 wherein said graft monomer is allyl glycidyl ether.

10. The method claimed in claim 3 wherein said graft monomer is glycidyl methacrylate.

11. A composition comprising a carbon-carbon backbone polymer containing residual unsaturation bearing graft moieties derived from a graft monomer containing ethylenic unsaturation and an epoxide moiety, and bonded to at least one of said graft moieties through an opened epoxide moiety, a primary or secondary coupling amine and bonded to at least one of said graft moieties through an opened epoxide moiety a Mannich base formed by the reaction of an aldehyde, a primary or secondary amine, and a hindered phenol.

12. A composition as claimed in claim 11 wherein said carbon-carbon backbone polymer is a copolymer of ethylene-propylene or a terpolymer of ethylene-propylene-diene monomer.

13. A composition as claimed in claim 11 wherein said phenol is characterized by the formula:

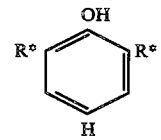

wherein R* is a hydrocarbon group bonded to the ring through a carbon atom which is bonded only to other carbon atoms.

14. A composition as claimed in claim 11 wherein said R* is tertiary butyl.

15. A composition as claimed in claim 11 wherein said amine is N-(beta-aminoethyl) piperazine.

16. A composition as claimed in claim 11 wherein said coupling amine is morpholine.

17. A composition as claimed in claim 11 wherein said graft monomer is characterized by the formula

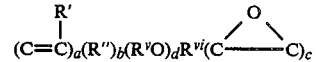

wherein

C=C is an ethylenically unsaturated double bond;

$R^v$ or $R^{vi}$ is a divalent hydrocarbon moiety selected from the group consisting of alkylene, alkarylene, aralkylene, cycloalkylene, and arylene;

R' is hydrogen or alkyl, alkaryl, aralkyl, or cycloalkyl,

R" is a divalent moiety selected from the group consisting of —COO— and —$R^v$—; and a is an integer greater than 0;

b is an integer 0–1;

c is an integer 1–3; and d is an integer 0–1.

18. A composition as claimed in claim 11 wherein said graft monomer is allyl glycidyl ether.

19. A composition as claimed in claim 11 wherein said graft monomer is glycidyl methacrylate.

20. A composition comprising a copolymer of ethylene-propylene or of ethylene-propylene-diene monomer bearing graft moieties derived from allyl glycidyl ether or glycidyl methacrylate and bonded to at least one of said graft moieties through an opened epoxide moiety, morpholine, and bonded to at least one of said graft moieties through an opened epoxide moiety a Mannich base formed by the reaction of a formaldehyde, N-(beta-aminoethyl) piperazine, and a hindered phenol containing an active hydrogen atom.

21. A composition as claimed in claim 11 wherein said hindered phenol is 2,6-di-t-butyl phenol.

22. A concentrate comprising an inert diluent-solvent and a composition comprising a copolymer of ethylene-propylene or of ethylene-propylene-diene monomer bearing graft moieties derived from allyl glycidyl ether or glycidyl methacrylate and bonded to at least one of said graft moieties through an opened epoxide moiety, morpholine, and bonded to at least one of said graft moieties through an opened epoxide moiety a Mannich base formed by the reaction of formaldehyde, N-(beta-aminoethyl) piperazine, and a hindered phenol containing an active hydrogen atom.

23. The method claimed in claim 5 wherein said phenol is 2,6-di-tertiary alkyl phenol.

24. The method claimed in claim 5 wherein said phenol is 2,6-di-t-butyl phenol.

25. A composition as claimed in claim 11 wherein said phenol is 2,6-di-tertiary alkyl phenol.

* * * * *